No. 617,707. Patented Jan. 17, 1899.
J. BAILEY & F. L. ARMSTRONG.
COAL RECEPTACLE.
(Application filed June 28, 1898.)

(No Model.)

Witnesses:
Inventors

UNITED STATES PATENT OFFICE.

JAMES BAILEY AND FREDERICK LIONEL ARMSTRONG, OF KINGSTOWN, IRELAND.

COAL-RECEPTACLE.

SPECIFICATION forming part of Letters Patent No. 617,707, dated January 17, 1899.

Application filed June 28, 1898. Serial No. 684,651. (No model.)

*To all whom it may concern:*

Be it known that we, JAMES BAILEY and FREDERICK LIONEL ARMSTRONG, subjects of the Queen of Great Britain and Ireland, and residents of Kingstown, in the county of Dublin, Ireland, have invented a certain new and useful Improvement in Coal-Receptacles, (for which we have obtained provisional protection in the United Kingdom of Great Britain and Ireland, dated May 5, 1898, and numbered 10,256;) and we do hereby declare that the following is a full, clear, and exact description of the invention, which will enable others skilled in the art to which it appertains to make and use the same.

The invention has reference to a new or improved receptacle for use as a coal-receptacle or for other analogous purposes.

In carrying out our invention we construct a vertical rectangular box or vessel of suitable material and of suitable dimensions. The top, which is open, has its sides splayed, so that when the lid is in position it (the lid) assumes an oblique plane. The lid is provided with a bridge-shaped handle, the grasping portion of which is above and clear of the same, the ends of said handle extending downward over the sides of the receptacle and engaging in suitably-formed vertical slots by means of swivel-studs in such a manner that the lid may be raised vertically a certain distance and then swung free of the top or open end of the receptacle, this operation not interfering with the regular bail function of the handle.

The bottom of the receptacle is provided with a countersunk slot or suitable handle for the purpose presently described.

The accompanying drawings will enable the construction and action of our invention to be more readily understood and carried into practice.

Figure 1:
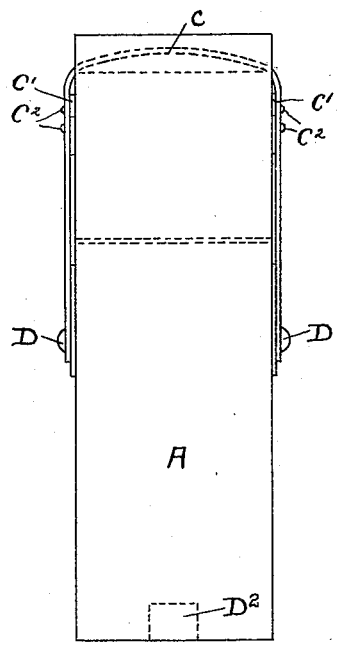
Figure 2:
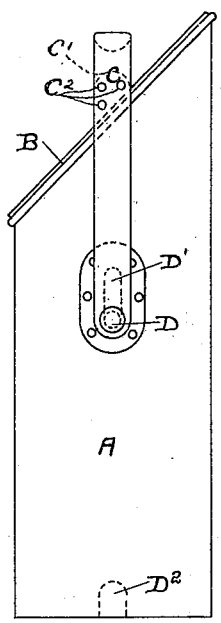
Figure 3:
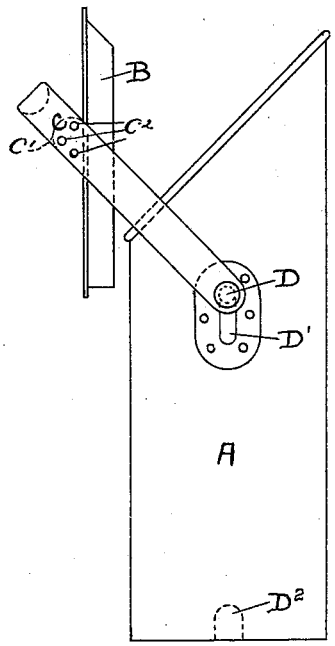
Figure 4:
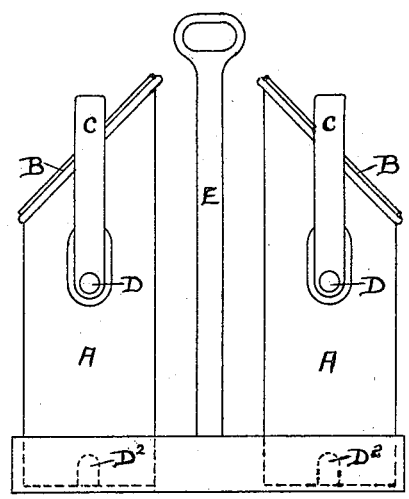

Figure 1 is a front elevation of the improved receptacle complete. Fig. 2 is a side elevation. Fig. 3 is a side elevation showing the receptacle open, the handle being raised and the lid swung to the left. Fig. 4 illustrates a suitable frame or carrier whereby a number of the improved receptacles may be conveniently carried about.

Similar letters of reference indicate corresponding parts in each of the views.

A indicates the receptacle; B, the slanting lid, over which is bridged the handle C, which is secured rigidly to the edges of the lid in the position shown, such rigid attachment being effected by means of ears $C'$ on the lid being rigidly clamped against the inside of the bail by rivets $C^2$. The ends of this handle are prolonged and are provided with swivel-studs D, which engage in a sliding manner in the vertical slots $D'$, so that when the lid is in position, as represented in Figs. 1, 2, and 4, the handle ends slide to the bottom of the slots, and when the handle is drawn upward they slide to the upper end of the slots, as shown in Fig. 3.

$D^2$ shows the countersunk slot in the bottom of the receptacle.

As thus constructed our invention forms a suitable vessel or hod for coal and likewise for other substances, and in order to pour out the contents the bridge-shaped handle is grasped with one hand, lifting the receptacle bodily and thereby lifting the cover to a greater extent by the rising of the swivel-studs D in the slots $D'$, then inserting the fingers of the free hand in the slot in the bottom and tilting the receptacle in the direction in which it is desired to discharge the contents.

It is obvious that the use of a receptacle constructed as herein described obviates the necessity of using the ordinary coal-scoop.

Our improved receptacle may conveniently be suspended from a wall or bracket instead of resting on the floor or carpet, as is usual with the present construction of coal-box.

To further add to the utility of our improved receptacle, two or more may be conveniently arranged in a suitable frame for portable purposes and may be made of a predetermined size, so as to accommodate certain measured quantities of coal or analogous substances. Fig. 4 illustrates an arrangement for this purpose which shows a suitable frame or carrier (resembling somewhat an ordinary cruet-stand) E, being a central standard provided with a suitable loop at the top to facilitate grasping by the hand.

Having now particularly described and ascertained the nature of our said invention, we declare that what we claim is—

1. In a receptacle for coal, &c. the combination with a body having vertical slots in its sides, and upper inclined side edges, of a bail or handle provided with studs engaging said slotted sides, and a lid rigidly and obliquely carried by said bail, the grasping portion of the bail being above and clear of said lid whereby, when the handle is grasped, it will be raised relatively to the receptacle and the lid correspondingly elevated to swing clear of the same, substantially as herein specified.

2. In a receptacle for coal &c. the combination with a body having vertical slots in its sides, upper inclined edges and a lower handle $D^2$, of a bail or handle provided with studs engaging said slotted sides, and a lid rigidly and obliquely carried by said bail, the grasping portion of the latter being above and clear of said lid whereby, when the handle is grasped, it will be raised relatively to the receptacle and the lid correspondingly elevated to swing clear of the same, substantially as herein specified.

In witness whereof we have hereunto affixed our signatures, this 13th day of June, 1898, in the presence of two witnesses.

JAMES BAILEY.
FREDERICK LIONEL ARMSTRONG.

Witnesses:
F. O'ROURKE,
ANGELO FAHIE.